No. 797,569. PATENTED AUG. 22, 1905.
T. GATEWOOD & J. W. McCARTY.
CHECK ROW CORN PLANTER.
APPLICATION FILED JAN. 28, 1905.
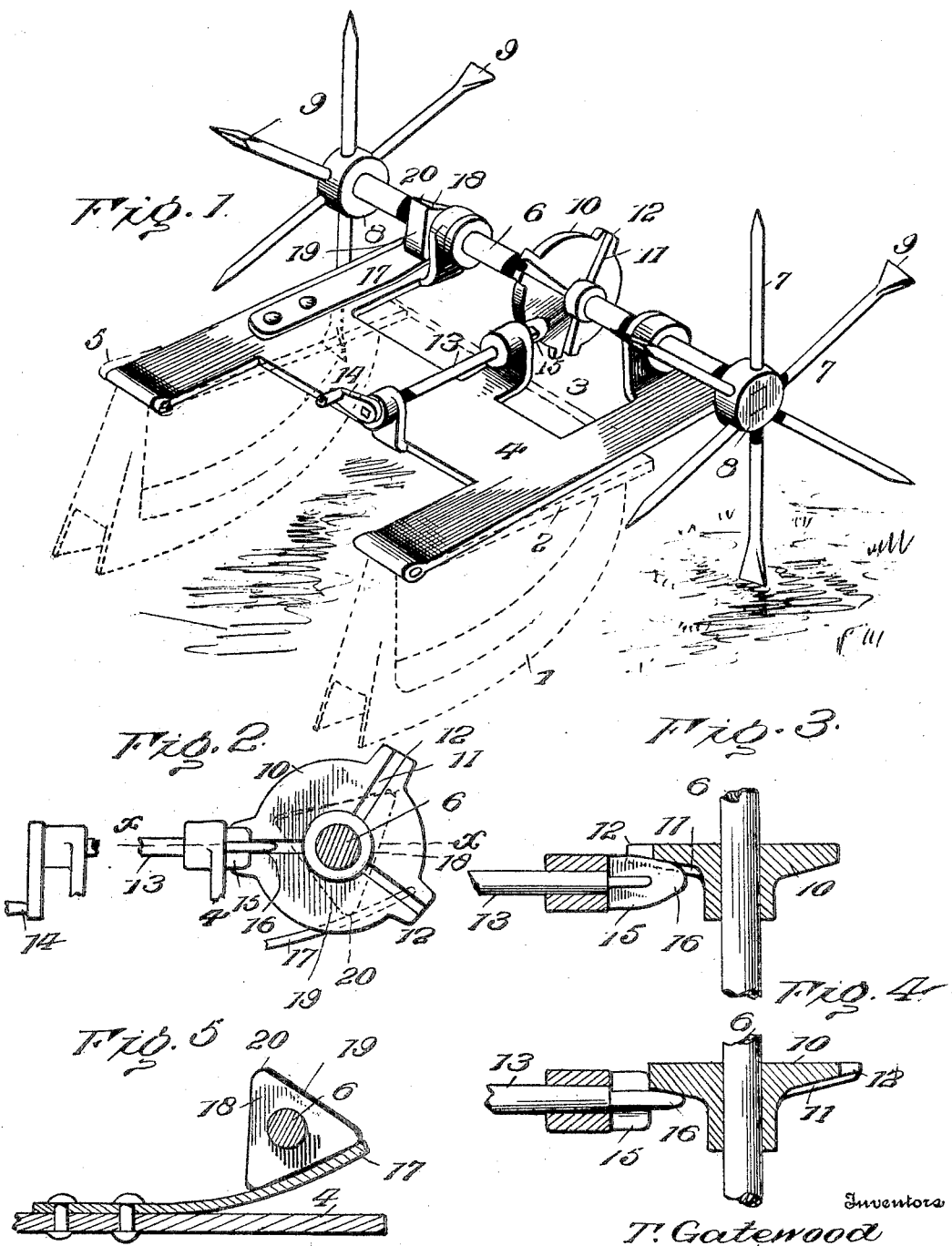
Inventors
T. Gatewood
J. W. McCarty

UNITED STATES PATENT OFFICE.

THEODORE GATEWOOD AND JAMES W. McCARTY, OF CHEROKEE, KANSAS.

CHECK-ROW CORN-PLANTER.

No. 797,569.  Specification of Letters Patent.  Patented Aug. 22, 1905.

Application filed January 28, 1905. Serial No. 243,110.

*To all whom it may concern:*

Be it known that we, THEODORE GATEWOOD and JAMES W. McCARTY, citizens of the United States, residing at Cherokee, in the county of Crawford and State of Kansas, have invented certain new and useful Improvements in Check-Row Corn-Planters, of which the following is a specification.

This invention relates to the type of agricultural machines specially designed for sowing seed in check-rows and which are devoid of the accustomed check-line and the many disadvantages resulting therefrom.

This invention provides mechanism of novel formation for positively actuating the seed-dropping mechanism at predetermined intervals and precluding operation thereof at intermediate points.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a portion of a planter, illustrating the application of the invention. Fig. 2 is a transverse section of the power-driven shaft and the actuating means coöperating therewith. Fig. 3 is a horizontal section on the line $x\,x$ of Fig. 2. Fig. 4 is a view similar to Fig. 3, showing the relation of the coöperating cogs when the power-transmitting shaft has received a one-quarter turn. Fig. 5 is a view in elevation of the means for properly positioning the markers when lifted from the ground and showing the power-driven shaft in cross-section.

Corresponding and like parts are referred to in the following description and indicated in all the views of the drawings by the same reference characters.

The runner-frame illustrated may be of any ordinary construction and is shown to demonstrate the application of the invention, the same comprising runners or furrow-openers 1, upper longitudinal bars 2, and transverse connecting-bars 3. The runner-frame supports the planter mechanism in the accustomed manner and is adapted to be raised and lowered in the usual way and is adapted to have the draft applied thereto for drawing the machine over the field. Inasmuch as these parts are well understood and of ordinary construction, illustration thereof has not been deemed necessary.

The frame 4, supporting the actuating mechanism, is hinged or pivotally connected at its rear end to the runner-frame at 5 and extends over the latter and is free to move vertically at its front end. The power-transmitting shaft 6 is journaled in bearings at the front end of the pivoted frame 4 and is provided at its ends with rimless actuating-wheels, comprising spokes 7, let into hubs 8, fast upon the shaft 6, so as to rotate therewith. Alternate spokes have their outer ends transversely widened or flattened, as shown at 9, to form markers for indicating the hills, which is essential in order to insure transverse alinement of the rows. The intermediate spokes are pointed. Greater accuracy is obtained by utilizing the rimless wheels as actuating means for operating the seed-dropping mechanism. A disk 10 is fast upon the shaft 6 and is convex upon one side and is formed in the convex side with radial grooves 11 and upon its periphery with spaced cogs 12 in line with and at each side of the respective grooves 11. The grooves 11 and spaced cogs 12 are in transverse alinement with the respective markers.

The power-transmitting shaft 13 is longitudinally disposed and is provided at one end with a crank 14 for actuating the seed-slide or analogous part (not shown) in the manner well understood. Cogs 15 are provided at the opposite end of the power-transmitting shaft 13 and coöperate with the cogs 12 to effect intermittent rotation of the shaft 13. A flattened extension 16 projects from the extremity of the shaft 13, provided with the cogs 15, and is of tapered form and is adapted to bear against the convex or grooved side of the disk 10 and prevent rotation of the shaft 13 in either direction during the interval between adjacent sets of cogs 12. When the shaft 13 is moved by engagement of a cog 12 with a cog 15, an edge portion of the flattened extension 16 enters the groove 11, thereby permitting rotation of the shaft without binding. Each set of cogs 12 imparts a half-revolution to the shaft 13, thereby throwing the crank 14 from one side to the other, so as to move the seed-slide a full throw in one direction. Dropping of grain between the hills is prevented by a side of the flattened extension 16 riding upon the disk 10 between the grooves 11.

Means coöperate with the power-driven shaft 6 to insure proper positioning of the markers when the actuating-wheels are lifted from the ground when the runner-frame is elevated. This means consist of a flat spring 17 and a setting-cam 18, the latter being fast upon the shaft 6 and having a plurality of flat faces 19 and rounded points 20. The setting-cam is adjusted with reference to the spring 17 and actuating-wheels, so that when a flat face 19 is encountered by the spring 17 a set of markers 9 occupy a pendent position, so that upon lowering the frame 4 the lowermost markers will make direct engagement with the ground and insure proper movement of the seed-dropping mechanism as the planter advances. Should the frame 4 be elevated at a time when the setting-cam does not bear squarely with one of its flat faces upon the spring 17, the latter will exert sufficient force to move the setting-cam and the shaft 6 to cause a flat face 19 of the setting-cam to bear squarely upon said spring, with the result that the actuating-wheels are moved to bring a set of markers in proper pendent position for engaging with the ground when the actuating-wheels are lowered into operating position.

Having thus described the invention, what is claimed as new is—

1. In a planter, in combination with the runner-frame, a second frame hinged or pivotally connected at its rear end to the runner-frame and extended over the latter and movable therewith when raised or lowered, a power-driven shaft journaled to the front portion of the pivoted frame and provided with actuating-wheels, and means for transmitting motion from said power-driven shaft to the seed-dropping mechanism, substantially as set forth.

2. In actuating mechanism for planters, the combination of a power-transmitting shaft provided with cogs and a flattened extension, and a disk having sets of cogs at intervals for coöperation with the cogs of the power-transmitting shaft to impart periodical movement thereto, said flattened extension being adapted to ride upon the disk between the sets of cogs to prevent rotation of the power-transmitting shaft during its periods of rest, substantially as set forth.

3. In actuating mechanism for planters, the combination of a power-transmitting shaft provided with cogs and a flattened extension, a disk having spaced cogs arranged at intervals for coöperation with the cogs of said power-transmitting shaft for imparting intermittent rotary movement thereto, and having grooves in a side to receive the edge portions of said flattened extension, the latter adapted to ride upon the part of the disk between said grooves to hold the power-transmitting shaft against rotation during its period of rest.

4. In combination, a power-transmitting shaft provided with cogs and a flattened extension, and a disk having spaced cogs projected from its edge and having one side convexed and grooved for coöperation with the aforesaid flattened extension, substantially as set forth.

5. In a planter, the combination of the power-driven shaft provided with markers, a setting-cam, and a spring coöperating with said cam to properly position the markers when elevated from the ground.

In testimony whereof we affix our signatures in presence of two witnesses.

THEODORE GATEWOOD. [L. S.]
JAMES W. McCARTY. [L. S.]

Witnesses:
J. W. KELSO,
F. L. WEBSTER.